Daskam

[15] 3,636,641
[45] Jan. 25, 1972

[54] RADIOLOGICAL TRAINING DEVICE

[72] Inventor: Samuel W. Daskam, R.D. 2 Box 360, Flemington, N.J. 08822

[22] Filed: Apr. 7, 1969

[21] Appl. No.: 814,045

[52] U.S. Cl.............................................35/1, 325/67, 325/364
[51] Int. Cl............................................G09b 9/00, H04b 1/00
[58] Field of Search...................35/1; 73/432; 325/363, 364, 325/67, 398, 339, 340; 340/177

[56] References Cited

UNITED STATES PATENTS

| | | | |
|---|---|---|---|
| 3,160,750 | 12/1964 | Kiehn | 325/364 |
| 3,276,143 | 10/1966 | Jaquiss | 35/1 |
| 3,293,777 | 12/1966 | Shaw et al. | 35/1 |
| 3,363,329 | 1/1968 | Filipov | 35/1 |

*Primary Examiner*—Lawrence Charles
*Assistant Examiner*—J. H. Wolff
*Attorney*—Buckles and Bramblett

[57] ABSTRACT

There is disclosed a training device for simulating the action of a nuclear radiation detector. A transmitter emits a single-frequency RF signal in the VHF frequency range. The simulated detector is a radio receiver having a voltage-controlled multivibrator with an output to a meter and a headset. Thus, audible clicks are produced whose repetition rate varies inversely with the distance from the transmitter. The use of a VHF frequency results in the simulated field being distorted by reflection from surrounding terrain.

6 Claims, 2 Drawing Figures

PATENTED JAN 25 1972 3,636,641

INVENTOR.
Samuel W. Doskam
BY
Wooster, Davis & Cifelli
ATTORNEYS.

3,636,641

RADIOLOGICAL TRAINING DEVICE

BACKGROUND OF THE INVENTION

Due to the importance of training military, industrial, and civil defense personnel in monitoring radioactive fallout, a number of simulators have been developed. These simulators customarily comprise a radiofrequency transmitter which transmits a pulsed signal. The simulated detector unit is usually a simple receiver with associated meter and headphones. In an actual radiation detector the click rate varies directly with the amount of radioactivity and inversely with the distance from the radioactive source. Accordingly, in prior art simulators, some means in required in the transmitter for achieving the desired pulse rate variation. This has required an unduly complex transmitter and often requires a human operator or mechanical means for varying the pulse rate. In addition, actual fallout fields are usually distorted and, to accomplish this in a simulated field, requires some relatively difficult and expensive techniques, such as use of multiple transmitters. As a result, the realism of the simulated field if substantially decreased. Also, these devices are incapable of simulating very small and localized radiation fields, such as would be encountered, for example, in clothing contaminated by radioactive material.

Accordingly, it is the primary object of the present invention to provide an improved radiological training device which employs a simple, small and inexpensive single-frequency transmitter and wherein the simulation of radioactive emissions takes place in the receiver unit.

SUMMARY OF THE INVENTION

The present invention comprises a radiation detection training apparatus including means for transmitting energy. Separate means is provided for receiving a portion of the energy at a remote location, and producing a first signal having a single strength proportional to the energy level received. A pulsed output signal is produced having a pulse rate which is proportional to the signal strength of the first signal.

BRIEF DESCRIPTION OF THE DRAWING

This invention may be best understood by reference to the following description, taken in conjunction with the accompanying drawing wherein.

DESCRIPTION OF THE PREFERRED EMBODIMENT

Figure 1:
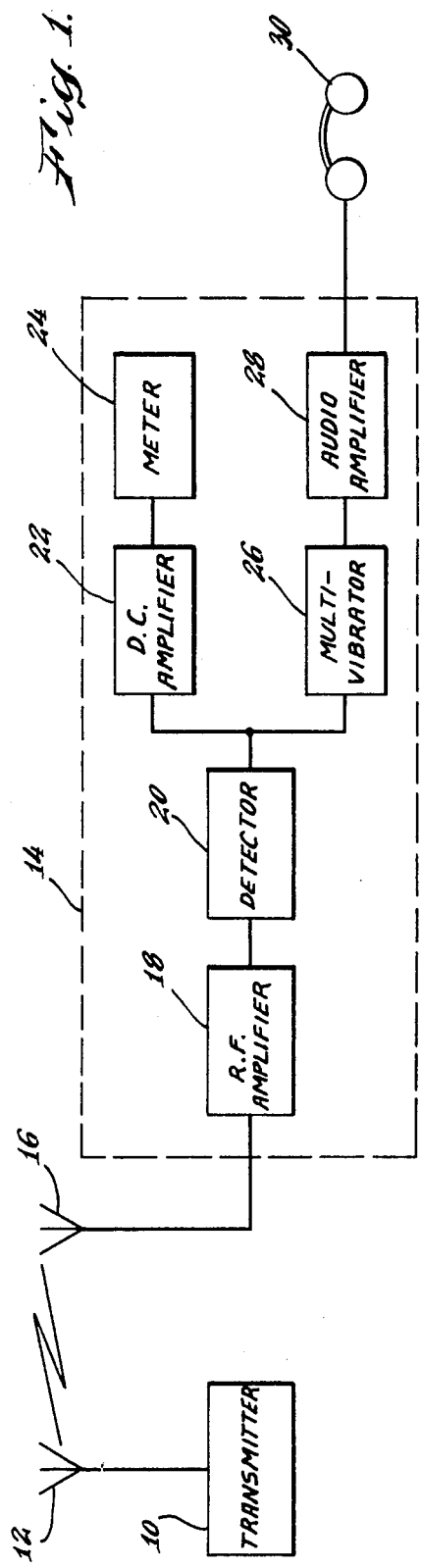
FIG. 1 is a block diagram of a radiological training device in accordance with the invention.

With particular reference to FIG. 1, there is illustrated a radiological training device comprising a transmitter 10 with an antenna 12. The transmitter 10 is designed to transmit a single-frequency signal in the VHF range, for example 145 mHz. A receiver unit 14 is provided which simulates a radioactivity detector and includes a receiving antenna 16 supplying an RF amplifier 18. The amplified output signal is supplied to the detector 20, and a portion of its output is amplified by DC amplifier 22. The amplified DC output is supplied to a meter 24 which has a scale calibrated to simulate an actual radiological instrument. The remaining portion of the detected signal is supplied to a one-shot multivibrator 26 which supplies a pulsed output signal to an audioamplifier 28 which, in turn, supplies clicking sounds through headset 30. As the strength of the signal received by antenna 16 and supplied to multivibrator 26 is inversely proportional to the distance of the receiving unit from the transmitter 10, it will be seen that the click rate produced in headset 30, which is directly proportional to the strength of the received signal, will provide a very accurate analogy to the functioning of an actual detector.

It will be noted that the transmitter 10 may be a very small, simple and inexpensive unit. Such a transmitter may be made in approximately the size of a wristwatch which may be hidden upon a person or in a vehicle. This would then permit a training exercise to be carried out which would simulate the monitoring of clothing, vehicles, etc. Thus, the device of this invention permits a much more flexible training program than has previously been possible.

Figure 2:
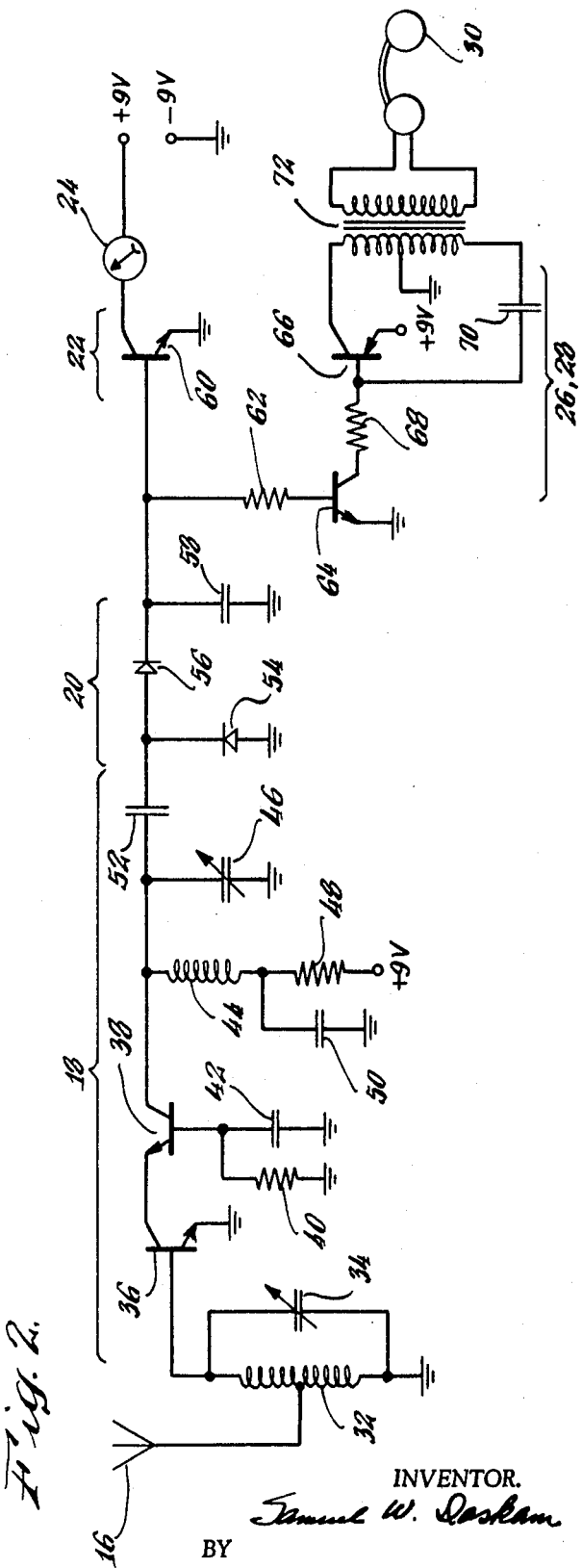
FIG. 2 is a circuit diagram of the device of FIG. 1.

In FIG. 2 there is illustrated a schematic diagram of a circuit of the type described with reference to FIG. 1. The receiving antenna 16 feeds the RF amplifier 18 portion comprising an inductance 32 and capacitance 34 which resonate at the assigned frequency. The output from the resonant circuit is applied to the base of amplifier transistor 36 having a grounded emitter and its collector connected to the emitter to transistor 38. The base of transistor 38 is connected to ground through a bias resistor 40 and a bypass capacitor 42. The collector of transistor 38 is connected to a second resonant circuit comprising inductance 44 and capacitor 46 which also resonates at the assigned frequency. The inductance 44 is connected through a collector bias resistor 48 for transistor 38 to a +9-volt power supply. A bypass capacitor 50 is connected to ground from a point intermediate inductance 44 and resistor 48.

The amplified radio signal from amplifier 18 passes through a coupling capacitor 52 to the detector 20 comprising diodes 54, 56 which are connected to act as voltage doublers. Any residual radiofrequency is bypassed to ground through capacitor 58.

A portion of the DC output from detector 20 is applied to the base of DC amplifier transistor 60 which is connected to meter 24 across the 9-volt DC power supply. The remaining portion of the DC output is supplied through resistor 62 to the multivibrator portion comprising the transistors 64, 66. The base of transistor 66 is connected to the collector of transistor 64 through a resistor 68, the emitter of transistor 66 being connected to the +9-volt power supply. The output of the multivibrator is coupled through capacitor 70 to an impedance matching transformer 72 whose output supplies the headphones 30.

It is believed that the many advantages of this invention will now be apparent to those skilled in the art. As has been referred to above, the fact that the transmitter operates in the VHF range means that reflections from terrain features, and obstructions by such features, will create a distorted field and provide extremely realistic training conditions. It will also be understood that a number of variations and modifications may be made in this invention without departing from its spirit and scope. For example, the preferred embodiment described above, utilizes electromagnetic radiation in the VHF range. However, the device is not so limited and may be adapted for use with other frequency ranges including those of visible light, infrared, ultraviolet, microwave, etc. In addition to electromagnetic radiation, the invention may also be used to advantage with other types of energy such as heat and sound. Also, the RF amplifier may be dispensed with if the received signal is sufficiently strong. Accordingly, it is to be understood that the foregoing description is illustrative only, rather than limiting.

What is claimed is:

1. Radiation detection training apparatus which comprises: a VHF radio transmitter; antenna means remotely positioned from said transmitter for producing a first signal having a signal strength proportional to the energy level received from said transmitter; and means for receiving said first signal and producing a pulsed output signal, the pulse rate of said output signal being proportional to the signal strength of said first signal.

2. The apparatus of claim 1 wherein said means for producing a pulsed output signal comprises a voltage controlled multivibrator.

3. The apparatus of claim 1 wherein said means for producing a first signal is a detector.

4. The apparatus of claim 3 wherein said means for producing an output signal comprises a voltage-controlled multivibrator.

5. The apparatus of claim 3 additionally comprising a meter responsive to said first signal to give a visual readout.

6. The apparatus of claim 1 wherein said antenna means comprises a receiving antenna, a resonant circuit receiving the antenna output, and a detector for converting the output of said resonant circuit to a DC signal; and wherein said output signal producing means comprises a voltage controlled multivibrator connected to receive said DC signal, and sound producing means for emitting audible clicks in response to pulses from said multivibrator.

* * * * *